United States Patent [19]
Butler et al.

[11] 3,924,259
[45] Dec. 2, 1975

[54] ARRAY OF MULTICELLULAR TRANSDUCERS

[75] Inventors: John L. Butler, Marshfield; William M. Pozzo, North Easton, both of Mass.

[73] Assignee: Raytheon Company, Lexington, Mass.

[22] Filed: May 15, 1974

[21] Appl. No.: 469,996

[52] U.S. Cl. .................. 340/5 R; 310/9.5; 310/9.6; 340/3 R; 340/9; 340/10
[51] Int. Cl. ...................... H04b 11/00; H04r 17/00
[58] Field of Search .......... 340/3 R, 5 R, 8 R, 9, 10, 340/12; 310/9.5, 9.6

[56] References Cited
UNITED STATES PATENTS

| | | | |
|---|---|---|---|
| 2,549,872 | 4/1951 | Willard | 340/10 X |
| 2,943,297 | 6/1960 | Steinberger et al. | 340/9 |
| 3,079,584 | 2/1963 | Sims | 340/10 |
| 3,824,531 | 7/1974 | Walsh | 340/3 R |

Primary Examiner—Richard A. Farley
Attorney, Agent, or Firm—David M. Warren; Joseph D. Pannone; Milton D. Bartlett

[57] ABSTRACT

A sonar transducer array in which each transducer is formed of multiple contiguous cells formed by dividing a regular polygonal shaped transducer into triangular sectors or cells. Such multicellular transducers have symmetry in their radiation patterns as measured in planes containing the axis of the transducer and a diameter separating the cells and, accordingly, in a transducer of many cells, there are many diametrical planes of symmetry of radiation pattern. The array is particularly useful for radiating high frequency radiation in which the diameter of the transducer has a length many times greater than a wavelength of the radiation, as occurs in the situation in which a finite amplitude wave is to be launched by the radiation of two beams of high frequency sonic energy.

12 Claims, 9 Drawing Figures

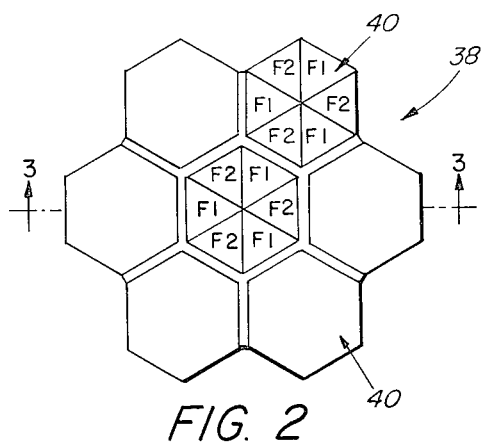
FIG. 2
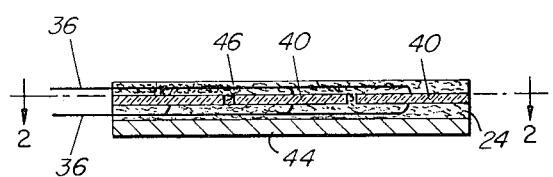
FIG. 3
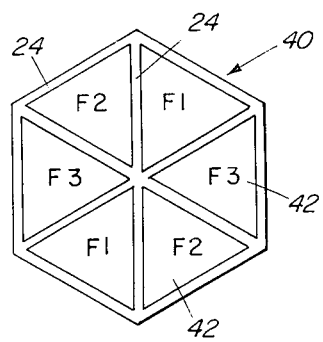
FIG. 4
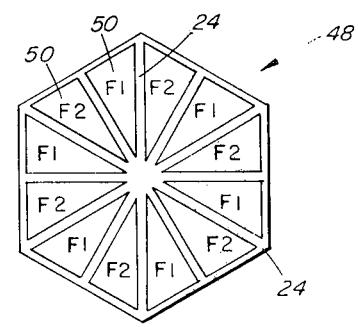
FIG. 5
FIG. 6
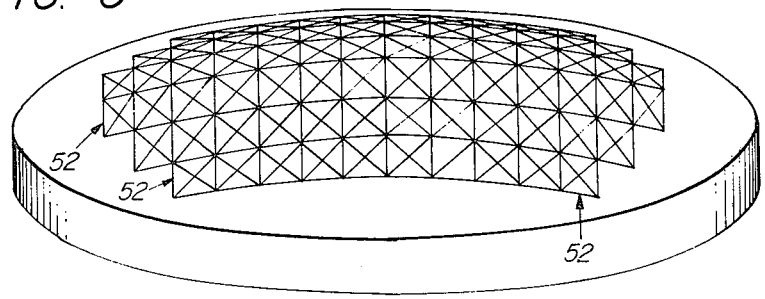
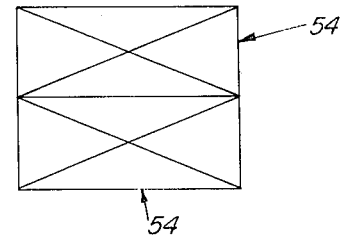
FIG. 7

ARRAY OF MULTICELLULAR TRANSDUCERS

BACKGROUND OF THE INVENTION

Transducer arrays utilized in the generation of directive beams of sonic energy are preferably built with transducer elements that are spaced apart by less than one-half wavelength measured from center to center of the transducer elements in order to provide a radiation pattern that is free of grating lobes. Such an array of transducer elements is readily connected via phase shifters or delay lines to permit electronic steering of the beam of radiation. Such arrays are readily fabricated for the radiation of sonic energy into the waters of the ocean at a relatively low frequency on the order of 3 kHz (kilohertz) since the wavelength of such radiation is substantially longer than the diameter or diagonal of a transducer element which is typically on the order of a few inches.

A problem arises when such arrays are to be built for the radiation of sonic energy at a relatively high frequency of, for example, 200 kHz and especially in those situations wherein a plurality of beams of sonic energy at differing frequencies are to be radiated from a common radiating aperture. At these frequencies, the wavelengths are too small to readily permit the fabrication of transducer elements which are of sufficiently small physical size to permit their being spaced apart by distances no greater than approximately one-half wavelength. And, furthermore, even if such transducer elements are built, many more of these miniature sized transducer elements must be utilized to provide a radiating aperture for the array to equal the size of the radiating aperture which is utilized in the aforementioned low frequency situation. Approximate equality of the overall sizes of the low frequency and high frequency arrays is required if they are to radiate approximately the same amount of acoustic power. However, even with the greatly increased number of transducer elements in the high frequency array, there is a loss of radiated power due to the generation of heat by friction between each of the transducer elements and the acoustic insulating material, such as compressed paper or cork frequently referred to as pressure release material, which is typically placed between each of the transducer elements to permit them to vibrate independently of each other.

SUMMARY OF THE INVENTION

The aforementioned problems are overcome and other advantages are provided by a transducer array which, in accordance with one embodiment of the invention, is composed of subgroupings of triangular shaped radiating elements which share a common vertex such that each subgrouping has the form of a multicellular transducer with an outer periphery in the shape of a regular polygon. Where sonic energy is to be radiated simultaneously at two different frequencies, the regular polygon has an even number of sides with an even number of triangular radiating elements at each of the frequencies. If sonic energy is to be radiated simultaneously at more than two frequencies, then the regular polygon would have a number of sides equal to a multiple of three, for example, if three frequencies are present, or a multiple of five if, for example, five frequencies are present. Slight variations from the overall regular polygonal shape are permitted so that, as exemplified by other embodiments of the invention, the overall shape of the multicellular transducer may be circular or, for example, a square-shaped or rectangular-shaped multicellular transducer may be employed in which the square or rectangle is divided into eight or twelve triangular regions symmetrically positioned about the center of the square. In the case of eight triangular regions or sectors, the diagonals of the square or rectangle and rays perpendicular to the sides of the square or rectangle serve as the boundaries between the sectors.

A feature of the multicellular transducer having an even number of sector cells is that a radiation pattern measured in a plane containing the axis of the transducer and a diagonal of the face of the array is equal to the radiation pattern measured in such a plane containing another diagonal of equal length serving as a sector boundary. This is the case irrespectively of the wavelength of the radiant energy radiated from the face of the multicellular transducer. In addition, the shape of the radiation pattern is the same as that obtained from a single transducer element having the same outer periphery as the multicellular transducer. For example, if the multicellular transducer is utilized for radiating sonic energy at two frequencies in which case alternate sectors of the transducer radiate at one frequency while the remaining sectors radiate at the other frequency, the radiation pattern measured for either one of the two frequencies is the same pattern which would be obtained if all the sectors of the transducer radiated at that frequency. There is, however, a decrease in the amplitude of the radiation at the one frequency where only half of the sectors radiate at that frequency.

The array of multicellular transducers is particularly useful in the radiation of sonic energy at two relatively high frequencies associated with the finite amplitude effect in seawater to produce a relatively low frequency radiation with a radiation pattern having a directivity approximately equal to the directivity of the high frequency radiations. A system employing an electronically steerable relatively low frequency beam of sonic energy resulting from the finite amplitude effect is disclosed in a pending application for United States patent having Ser. No. 323,602 filed Jan. 15, 1973 in the name of George M. Walsh, now U.S. Pat. No. 3,824,531, wherein an array of transducers radiating at one frequency are interleaved among an array of transducers radiating at a second frequency with the transducers being fed by delay circuits having selectable delays for steering beams at the first and the second frequencies.

The use of the multicellular transducer array of this invention provides for a significant improvement in an electronically steered finite amplitude radiation pattern since the shapes of the sectors of the multicellular transducers inhibit the generation of transverse surface waves along the surface of the radiating aperture of the transducer even though the length of a sector as measured along the diagonal of the multicellular transducer is many wavelengths at the radiated frequency. In addition, the shape of the resulting beam at the difference frequency is substantially invariant with the direction in which the beam may be scanned such as, for example, in the case of a hull-mounted sonar array, a scanning in the roll and pitch planes. This is particularly useful in a situation wherein a finite amplitude sonar is to be utilized in ocean bottom survey work in which case a yawing of the ship carrying the sonar apparatus would have little effect on the data being gathered because of the symmetry of the beam of sonic energy about its axis.

BRIEF DESCRIPTION OF THE DRAWINGS

The aforementioned features and other aspects of the invention are explained in the following description taken in connection with the accompanying drawings wherein:

FIG. 2 is an array of hexagonally-shaped multicellular transducers with each of the multicellular transducers being oriented in the same direction, the figure being a sectional view taken along the line 2—2 of FIG. 3 to expose the front faces of the transducers;

FIG. 3 is a sectional view taken along the line 3—3 of FIG. 2;

FIG. 4 is a plan view of a multicellular transducer of FIG. 2 showing six sector-shaped transducer elements separated by acoustic isolation material;

FIG. 5 is a plan view of a hexagonal array divided into twelve triangular elements;

FIG. 6 shows an array of square multicellular transducers wherein the radiating surface is curved in two dimensions;

FIG. 7 shows a rectangular multicellular transducer;

DETAILED DESCRIPTION

Figure 1:
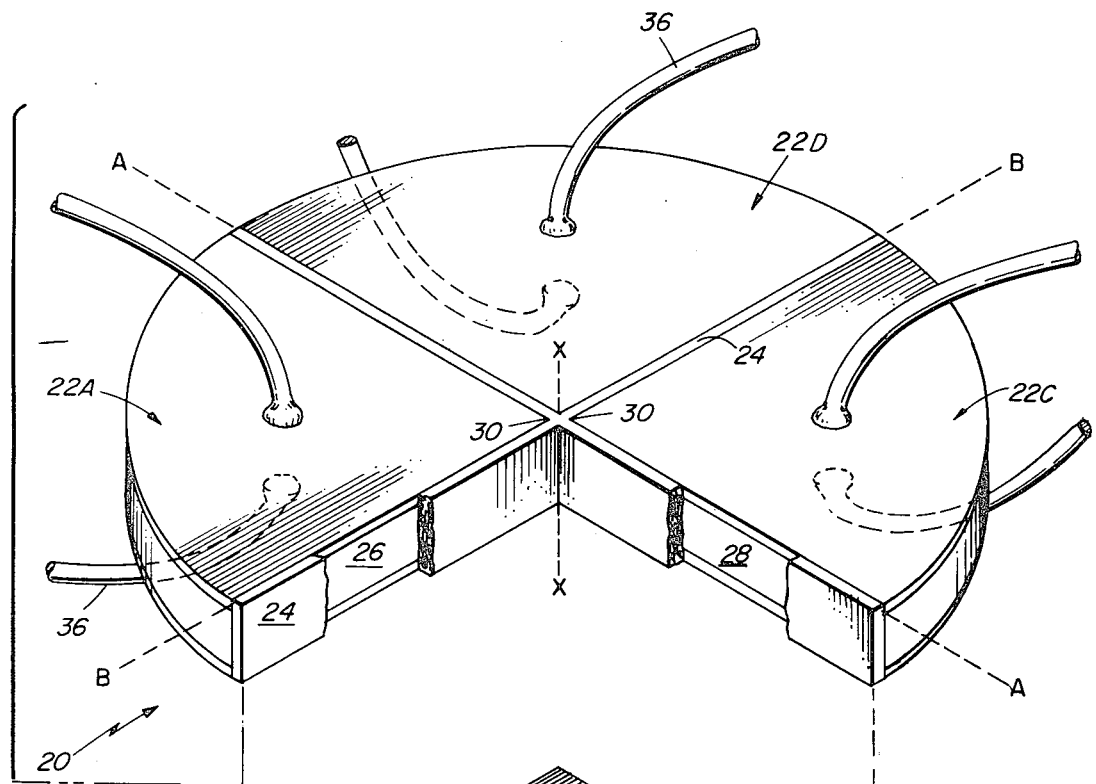
FIG. 1 is an isometric view, partially exploded, showing a multicellular transducer wherein the front face of each cell is a quadrant of a circle.
Figure 1:
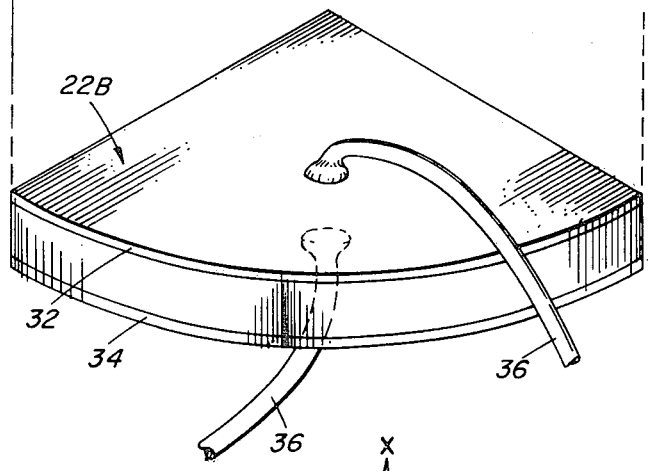

Referring now to FIG. 1, there is seen, in accordance with the invention, a multicellular transducer 20 formed of a group of transducer elements 22 which will be further identified by the letters A, B, C and D when it is desired to identify a specific one of the elements 22, the figure showing an exploded view in which one of the transducer elements 22 is shown separated from the remaining transducer elements 22 to expose sound isolation material 24 placed between each of the transducer elements 22 to permit them to vibrate independently of each other. A part of the sound isolation material 24 is cut away to expose a first side 26 of one transducer element 22 and a second side 28 of another transducer element 22, each of the transducer elements 22 having the same size and shape such that the first sides 26 and the second sides 28 meet perpendicularly at a vertex 30. In further embodiments to be described hereinafter, it will be seen that the vertex angles may have a value other than 90° and, furthermore, that only symmetrically positioned vertex angles need be equal.

To facilitate description of the arrangement of the transducer elements 22 in FIG. 1, it is convenient to consider the sound isolation material 24 to be infinitely thin. Then the four vertices 30 meet along a central axis X—X of the multicellular transducer 20, and the first and second sides 26 and 28 of one transducer element 22 are seen to be coplanar with the first and second sides 26 and 28 of the diametrically opposed transducer element 22. For example, the first sides 26 of the transducer elements 22A and 22B are seen to lie within plane B, containing the axis X—X and diameter B-B, while the second sides 28 of the transducer elements 22A and 22B are seen to lie within plane A, containing the axis X—X and diameter A—A.

A feature of the invention is the fact that the first sides 26 of opposed transducer elements 22 are coplanar. The transducer elements 22 radiate in the direction of the axis X—X and have a depth as measured along the axis X—X of typically one-quarter wavelength if a backing plate is used and one-half wavelength if no backing plate is utilized. If only the transducer elements 22A and 22C are energized, the radiation pattern measured in plane A is identical to the radiation pattern measured in plane B, this pattern having the same form but only half the amplitude of the pattern which would be obtained if all four transducer elements 22 are energized. Thus, it is seen that by arranging the transducer elements 22 such that the sides intersecting at the vertex 30 of one transducer element 30 are coplanar with the corresponding sides of the oppositely positioned transducer element 22, greater uniformity of directivity pattern is obtained. If the group of transducer elements 22 were to comprise, for example, eight or sixteen elements each of which have radiating surfaces in the form of equal sectors of a circle, then there would be respectively four and eight planes of symmetry of the radiation pattern.

The multicellular transducer 20 is capable of radiating sonic energy having a wavelength many times smaller than the diameter of the multicellular transducer 20 without the excessive generation of transverse modes of vibrations across the radiating surface as occurs with transducers of the prior art having a radiating surface much larger than a wavelength of the radiation. The inhibiting of the transverse modes of vibration across the radiating surface is provided by the sound isolation material 24 which divides the radiating aperture of the multicellular transducer 20 into a multiplicity of generally triangular-shaped cells which, in the embodiment of FIG. 1, are the four quadrants comprising the four transducer elements 22. It is believed that the attenuation of the transverse waves may be due to the fact that the cells do not have parallel opposed substantially flat walls as is present in non-triangular figures such as a square and a hexagon which reflect the waves back and forth.

With respect to the fabrication of the multicellular transducer 20, the sound isolation material 24 is typically composed of a compressed paper such as craft paper, or a material known commercially as Corprene which is a mixture of cork and rubber. The transducer elements 22 comprise a piezoelectric ceramic material such as lead zirconate titanate. The ceramic material of the transducer elements 22 is bonded directly to the sound isolation material 24. Upper and lower metallic electrodes 32 and 34 are bonded or painted to the upper and lower surfaces of each transducer element 22 whereby electric wires 36 which are bonded to the electrodes 32 and 34 can apply electric energy to the transducer elements 22 to excite the sonic radiation.

Referring now to FIGS. 2, 3 and 4, there is seen an array 38 comprising seven multicellular transducers 40 arranged in a honeycomb fashion, a plan view thereof being seen in FIG. 2 with a sectional view along the line 3—3 being shown in FIG. 3. A plan view of an individual multicellular transducer is shown in FIG. 4, and is indicated diagrammatically in two of these transducers in FIG. 2. As seen in FIG. 4, each multicellular transducer 40 comprises six transducer elements 42 having radiating surfaces in the shape of equilateral triangles and being separated by the sound vibration material 24. The sound vibration material 24 is positioned along three intersecting planes in the manner of a star pattern which separates the six transducer elements 42 and is also positioned along the outer periphery of the multicellular transducer 40. As seen in FIG. 2, each of the multicellular transducers 40 is oriented in the same direction such that the planes of the star patterns of sound vibration material 24 in one multicellular transducer 40 are parallel to the corresponding planes in each of the other multicellular transducers 40. Each of the multicellular transducers 40 of FIG. 3 is spaced apart by a layer of the sound vibration material 24 having the same thickness as the layers of the material along the planes of the star pattern.

The sectional view of FIG. 3 shows a backing member 44 positioned at a node of the sonic vibration and having sufficient mass for directing substantially all of the radiant energy through the front face of the array 38. The front face of the array 38 is in turn encapsulated by a layer 46 of a water impervious and sound transmissive material such as polyurethane, or alternatively by a rubber boot having a layer of oil between the rubber and the front face of the array 38. The plan view of FIG. 2 is taken along the line 2—2 of FIG. 3 which passes along the front face of the array 38 in order to show the array 38 which would otherwise be obscured by the layer 46. The backing member 44 is spaced apart from the back surface of the array 38 by a layer of sound isolation material 24 to which it is bonded and which is sufficiently resilient to permit the wires 36 attached to the electrodes on the back surface of the transducer elements 42 (in the same manner as was taught with reference to FIG. 1) to be embedded in the sound isolation material 24. With respect to the electric wires 36 attached to the front faces of the transducer elements 42, these wires are embedded in the material of the layer 46. The backing member 44 is also sufficiently rigid to serve as a support for the array 38.

It is noted that the thickness of the layers of sound isolation material 24 is substantially less than a wavelength of the sonic energy radiated by the array 38. As a result, nowhere in the array 38 is there a region in which sources of sonic radiation are spaced apart by more than a fraction of a half wavelength. Accordingly, the array 38 produces a radiation pattern which is free of grating lobes. In addition, it is noted that since the corresponding planes of the star patterns of the sound isolation material 24 are parallel throughout the array 38, the preceding discussion of FIG. 1 with reference to the uniformity of radiation pattern applies throughout the array 38. Thus, the array 38 has three planes of symmetry of radiation pattern.

The array 38 is useful in the radiation of sonic energy simultaneously at three frequencies with the transducer elements 42 in any one multicellular transducer 40 radiating at the frequencies F1, F2 and F3, in accordance with the plan of FIG. 4 wherein the transducer elements 42 are labeled with the frequency of the radiation which they radiate. Other radiation schemes may also be utilized; for example, the frequency F1 may be set equal to the frequency F2 in which case only two frequencies of sonic energy are radiated with twice as much power being provided by the radiation at frequency F1 as compared to the radiation at the frequency F3. This arrangement provides a common acoustic center for the radiations at the three frequencies, but the shape of the directivity pattern differs somewhat from that which would be obtained if all the transducer elements radiated at the same frequency. However, in the two-frequency case in which the radiations at the frequencies F1 and F2 are arranged as shown in FIG. 2, wherein alternate triangular sectors radiate at F1 with the remaining sectors radiating at F3, the shape of the directivity pattern can be maintained as may be verified by the symmetry in the geometric construction in which the multicellular transducer 40 is folded about a diagonal to show that equivalently one-half the transducer radiates at one frequency.

Referring now to FIG. 5, there is shown a hexagonally-shaped multicellular transducer 48 having a construction similar to that of FIG. 4 except that the multicellular transducer 48 is provided with additional layers of sound vibration material 24 along planes which perpendicularly bisect each side of the hexagon. This provides twelve transducer elements 50.

FIG. 6 shows a diagrammatic view of an arrangement of square-shaped multicellular transducers 52 positioned by way of example to form a radiating surface which is curved in two dimensions as may be useful for positioning transducers within the hull of a ship or for providing a larger scanning angle of radiation than can be obtained with a flat surface transducer array. The diagonal lines in FIG. 6 represent layers of sound isolation material placed between the transducer elements in any one of the multicellular transducers 52. Thus, it is seen that the overall arrangement is composed of triangular transducer elements which, at the high frequencies of radiation utilized in finite amplitude sonar systems, have dimensions much longer than a wavelength of the radiation produced by these transducer elements. Nevertheless, the triangular shapes of the transducer elements sufficiently inhibit the generation of sonic waves which propagate transversely along and within the surface of the radiating aperture of the transducer array of FIG. 6 to provide the desirable properties of radiation associated with radiating elements that are smaller than a wavelength.

FIG. 7 shows an array of two multicellular transducers 54, each of which is rectangularly shaped having a pair of long sides and a pair of short sides. Each of the multicellular transducers 54 is divided by sound isolation material along diagonal planes to provide two pairs of triangular transducer elements, one pair of elements having obtuse triangular form and the other pair of elements having acute triangular form. In this case, there are two planes of symmetry of radiation pattern, the two planes corresponding to the two diagonals in each of the rectangles. In this case the two planes of symmetry are oriented at an acute angle relative to each other.

Figure 8:
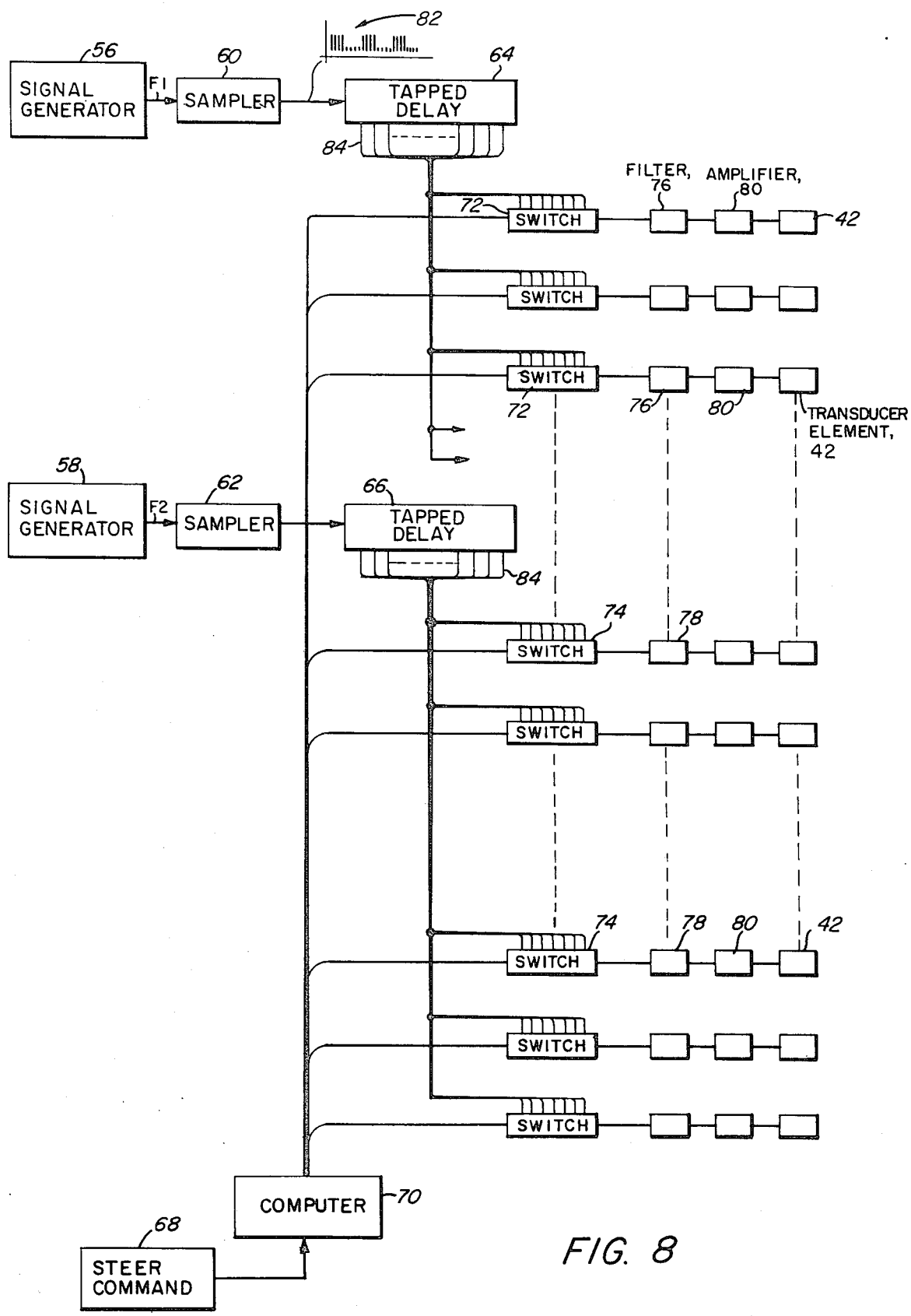
FIG. 8 is a block diagram of a system employing two signal generators for energizing an array of multicellular transducers with some of the transducers being energized with sonic energy at one frequency while the other transducers are energized with sonic energy of a second frequency to provide an electronically steerable finite amplitude sonar system.

Referring now to FIG. 8, there is seen a block diagram of a finite amplitude sonar system for the generation of a low frequency highly directive beam of sonic energy from an array such as that disclosed in FIGS. 2 or 6. Two signal generators 56 and 58 are provided for generating electrical signals at frequencies, respectively, F1 and F2 which are typically 200 kHz and 210 kHz to provide a beam of sonic energy in the far field of the array of transducer elements 40 or 52 having a frequency equal to the difference of F2 and F1, this difference being 10 kHz. The system of FIG. 8 further comprises samplers 60 and 62, delay units 64 and 66, a beam steering command unit 68, a computer 70, electronic switches 72 and 74, band pass filters 76 and 78, amplifiers 80 and transducer elements which may be, for example, the elements 50 of FIG. 5.

In operation, the system of FIG. 8 provides square wave signals at repetition frequencies F1 and F2 by the signal generators 56 and 58, the square wave signals preferably being modulated with a phase modulation to provide a modulation pattern suitable for correlating a signal received at the difference frequency (the receiving means not being shown in the figure) as disclosed in the United States patent entitled "System for Low-Frequency Transmission of Radient Energy," U.S. Pat. No. 3,786,405, which issued in the names of Mark. A. Chramiec and William L. Konrad on Jan. 15, 1974. The square wave signals from the generators 56 and 58 are sampled at a clock frequency much higher than F1 and F2 to provide a set of signal pulses as shown in the graph 82 which is composed of a sequence of logic 1 signals followed by a sequence of logic 0 signals, there being, for example, 64 of these signal pulses for each period of square wave of the signal generator 56. The clock signals for operating the samplers 60 and 62 as well as other timing signals are not shown in FIG. 8 since they are well known and are disclosed in FIG. 2 of the aforementioned patent application of George M. Walsh. The output of the sampler 60 is passed through the delay 64 and the output of the sampler 62 is passed through the delay 66. Both the delay units 64 and 66 which may be acoustic delay lines or shift registers have a plurality of taps indicated by lines 84 which are passed respectively to the switches 72 and 74 for selecting a specific one of the lines 84 for coupling a signal from the delay unit 64 to the filter 76 and for coupling a signal from the delay unit 66 to the filter 78. The filter 76 has a pass band centered at F1 and the filter 78 has a pass band centered at F2. Each of the switches 72 in accordance with signals provided by the computer 70 selects one of the lines 84 to provide a desired delay to the signal of the sampler 60 and, similarly, the switches 74 select an appropriately delayed signal of the sampler 62. The filters 76 and 78 attenuate harmonic frequencies of the square waves to provide substantially sinusoidal signals to the amplifiers 80 which then amplify the signals to a suitable power level for driving the transducer elements 42.

When the system of FIG. 8 is mounted onboard a ship, a beam steering command provided by the command unit 68 would direct the high frequency beams at frequencies F1 and F2 in a common direction to illuminate or ensonify a common region of the ocean, this common region having a length much longer than a diagonal of the arrays of FIGS. 2 and 6. In this way, the sources within the ocean water of the difference frequency radiation resulting from the nonlinear interaction of the two high frequency beams are arranged in the manner of an endfire array to produce the highly directive beam at the difference frequency. The direction of the difference frequency beam is the same as that of the two high frequency beams and, accordingly, the steering command unit 68 serves to steer the difference frequency beam in a manner as may be required, for example, to accomplish a survey of the ocean bottom. In response to the azimuth and elevation angles of the beam as provided by the command unit 68, the computer 70 computes the delays required for each of the transducer elements 42 to direct the two beams at frequencies F1 and F2 in the desired directions.

Figure 9:
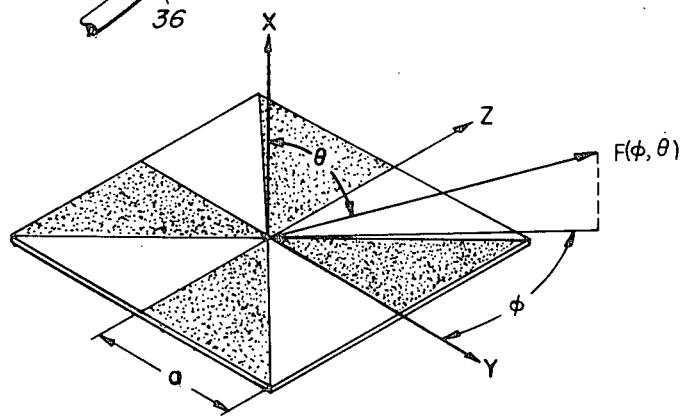
FIG. 9 is a diagram of a square-shaped multicellular transducer divided into eight triangular elements.

The equivalence of the radiation pattern provided by the total radiating aperture of a multicellular transducer to the radiation pattern as measured along a diagonal and provided by energization of alternate cells of the transducer will now be shown mathematically. Referring to FIG. 9, there is seen a diagram of a square-shaped multicellular transducer of which alternate sections are shaded, there being a total of eight sections formed by the two diagonals and the two perpendicular bisectors of the sides of the square. The face of the transducer is in the YZ plane and the X axis is normal thereto. The angle $\theta$ is measured from the X axis. The angle $\phi$ is measured from the Y axis in the YZ plane. A side of the square measures 2a. The diagram of FIG. 9 is useful in explaining the symmetry of the radiation pattern about the X axis and for showing that the pattern as measured along a diagonal or a perpendicular bisector has the same shape irrespectively of whether the entire square is radiating sonic energy or if only the shaded sections are so radiating. The radiation intensity $F(\theta,\phi)$ of the normalized far field pattern, found by integrating over the shaded area, is given by $$F(\theta,\phi) = \frac{\sin kaA}{kaA} \cdot \frac{\sin kaB}{KaB} + \frac{\sin^2((Ka/2)(A+B))}{k^2a^2B(A+B)} + \frac{\sin^2((ka/2)(A-B))}{k^2a^2B(A-B)} - \frac{2\sin(2kaA/2)\cos(2kaB/2)}{k^2a^2AB} \quad (1)$$

where
$$A = (\sin \theta)(\sin \phi) \quad (2a)$$

and
$$B = (\sin \theta)(\cos \phi) \quad (2b)$$

and $k$ is the wave number. It can further be shown from this equation that $$F(\theta,0°) = \frac{\sin(ka \sin \theta)}{ka \sin \theta} \quad (3)$$

$$F(\theta,90°) = \frac{\sin (ka \sin \theta)}{ka \sin \theta} \quad (4)$$

and $$F(\theta,45°) = \left[ \frac{\sin((ka/2)\sin \theta)}{(ka/2)\sin \theta} \right]^2 \quad (5)$$

Equations 3, 4 and 5 are identical to the beam pattern function for a square array apart from a scale factor (the last three terms in Equation 1 cancel for these three special cases). An array of these would also yield the same patterns as an array of square elements.

It is understood that the above-described embodiments of the invention are illustrative only and that modifications thereof will occur to those skilled in the art. Accordingly, it is desired that this invention is not to be limited to the embodiments disclosed herein but is to be limited only as defined by the appended claims.

What is claimed is:

1. A multiple frequency sound system comprising:
   an array of transducer elements, each of said transducer elements having a substantially triangular shape, each of said transducer elements having a vertex formed by two sides of its radiating aperture, said transducer elements being arranged in subgroupings within said array, the transducer elements in any one of said subgroupings being positioned with their respective vertices substantially contiguous, and each of said subgroupings being oriented within said array such that said subgroupings are contiguous to each other and each of said subgroupings is oriented such that corresponding transducer elements in each of said subgroupings are oriented in the same direction;

means coupled to each of said subgroupings for energizing oppositely positioned transducer elements in each of said subgroupings with signals at a first frequency; and means coupled to each of said subgroupings for energizing the remaining transducer elements with signals at a second frequency.

2. A system according to claim 1 wherein the wavelengths of said signals at said first and said second frequencies are smaller than a side of said triangular-shaped transducer elements.

3. A system according to claim 2 further comprising means coupled to said first and to said second energizing means for delaying individual ones of said signals, individual ones of said delayed signals being coupled to individual ones of said transducer elements.

4. A system according to claim 3 wherein the transducer elements in individual ones of said subgroupings are contiguous.

5. A system according to claim 4 wherein each of said subgroupings have a square shape, each side of one of said square-shaped subgroupings serving as a base for a plurality of triangular-shaped transducer elements, opposite sides of said square-shaped subgroupings serving as base lines for an equal number of said transducer elements.

6. A system according to claim 4 wherein each of said subgroupings is hexagonal in shape, a side of one of said hexagonal-shaped subgroupings serving as a base line for a plurality of triangular-shaped transducer elements, oppositely positioned sides of said hexagonal-shaped subgroupings serving as base lines for an equal number of said triangular-shaped transducer elements.

7. A system according to claim 4 wherein said transducer elements have radiating surfaces positioned along an arcuate surface.

8. A system according to claim 4 wherein each of said subgroupings is rectangular in shape, each of said rectangular shapes having one side which is longer than an adjacent side.

9. A system according to claim 4 wherein each of said subgroupings is circularly shaped.

10. A system according to claim 4 wherein each of said subgroupings has a shape in the form of a regular polygon.

11. A system for radiating acoustic energy comprising:

an array of radiating elements arranged in a plurality of subgroupings of said radiating elements, each of said radiating elements having a substantially triangular shape, corresponding ones of said triangular-shaped radiating elements in each of said subgroupings being oriented in the same direction, each of said radiating elements being spaced apart by a sound isolator a distance of less than one-quarter wavelength of radiation radiated by said radiating elements, said triangular shape inhibiting the formation of transverse modes of acoustic vibration; and means coupled to individual ones of said radiating elements for energizing said radiating elements to radiate radiation at a wavelength many times shorter than a side of said triangular-shaped radiating element.

12. A system for radiating sonic energy comprising:

an array of radiating elements positioned along a surface for radiating sonic energy therefrom; and means for energizing said radiating elements to radiate radiation at a wavelength many times shorter than a side of one of said radiating elements, each of said radiating elements having a substantially triangular shape, and each of said radiating elements being spaced apart by acoustic isolating means a distance less than one-quarter of said wavelength, said triangular shape inhibiting the formation of transverse modes of vibration across a radiating surface of an individual one of said radiating elements.

* * * * *

UNITED STATES PATENT OFFICE
CERTIFICATE OF CORRECTION

Patent No. 3,924,259　　　　　　　　　Dated　December 2, 1975

Inventor(s)　　John L. Butler and William M. Pozzo

It is certified that error appears in the above-identified patent and that said Letters Patent are hereby corrected as shown below:

Col. 5, line 33: change "surface" to --surfaces--.

Col. 7, line 10: change "Radient" to --Radiant--.

Col. 8, line 21,22: change "K" to --k--.

Col. 8, line 44,45: change "$(ka/\ 2)$" to --$(ka/\sqrt{2})$--

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*